United States Patent [19]
Booton

[11] Patent Number: 5,991,390
[45] Date of Patent: Nov. 23, 1999

[54] METHOD AND APPARATUS FOR TELEWORKING FROM REMOTE TERMINALS

[75] Inventor: Laurence J. Booton, Woodbridge, United Kingdom

[73] Assignee: British Telecommunications public limited company, London, United Kingdom

[21] Appl. No.: 08/875,521

[22] PCT Filed: Mar. 27, 1996

[86] PCT No.: PCT/GB96/00727

§ 371 Date: Jul. 29, 1997

§ 102(e) Date: Jul. 29, 1997

[87] PCT Pub. No.: WO96/31044

PCT Pub. Date: Oct. 3, 1996

[30] Foreign Application Priority Data

Mar. 28, 1995 [GB] United Kingdom .................... 9506290

[51] Int. Cl.[6] ...................................................... H04M 3/56
[52] U.S. Cl. ............................................ 379/265; 379/202
[58] Field of Search ..................................... 379/265, 266, 379/309, 202, 203, 204, 205, 206, 258

[56] References Cited

U.S. PATENT DOCUMENTS

| | | |
|---|---|---|
| 4,400,587 | 8/1983 | Taylor et al. . |
| 4,757,267 | 7/1988 | Riskin . |
| 4,800,583 | 1/1989 | Theis . |
| 5,465,286 | 11/1995 | Clare et al. ................................ 379/265 |
| 5,546,452 | 8/1996 | Andrews et al. ......................... 379/265 |

FOREIGN PATENT DOCUMENTS

| | | |
|---|---|---|
| 0 429 770 | 6/1991 | European Pat. Off. . |
| 0429770 A2 | 6/1991 | European Pat. Off. . |
| 0 520 483 | 12/1992 | European Pat. Off. . |
| 0520483 A1 | 12/1992 | European Pat. Off. . |
| 0 622 938 | 11/1994 | European Pat. Off. . |
| 0622938 A2 | 11/1994 | European Pat. Off. . |
| WO 89/03146 | 4/1989 | WIPO . |

*Primary Examiner*—Scott Wolinsky
*Attorney, Agent, or Firm*—Nixon & Vanderhye P.C.

[57] ABSTRACT

A teleworking facility is provided with a Computer/Telephony Integration ontroller connected to a private automatic branch exchange (PABX) and arranged to select an available one of a set of terminals to receive the identity of a teleworking agent requesting work (or select the identity of a teleworking agent to be offered work), and to command an automatic call distribution (ACD) system to record the teleworking agent's identity in association with the identity of the selected terminal. When the controller detects that the ACD system has connected an incoming call to the selected terminal, it commands the PABX to make an outgoing external call to the teleworking agent at the recorded remote terminal and to join the two calls in conference mode.

21 Claims, 2 Drawing Sheets

METHOD AND APPARATUS FOR TELEWORKING FROM REMOTE TERMINALS

This application claims the benefit under 35 U.S.C. §365(c) of International Application Number PCT/GB96/00727 filed on Mar. 27, 1996.

BACKGROUND OF THE INVENTION

1. Field of the Invention

This invention relates to a method of teleworking, particularly, but not exclusively, in association with a call centre having switching system, e.g. a Private Automatic Branch Exchange (PABX), associated with an Automatic Call Distribution (ACD) system, such combination being referred to herein as an ACD suite, and to call control apparatus for use with, or in combination with, an ACD suite to provide a teleworking facility.

2. Related Art

With the increasing use of telecommunications equipment in business, including telephones, facsimile machines, answering machines, and modems for data communications between computer terminals, there has been a similar increase in the number of employees who are equipped by their employers to work from home. The employer may pay for an additional exchange line at the employee's home for business telephone use, or the employer may arrange to reimburse the employee for business calls made on the employee's private residential exchange line.

In a call centre it is known to use an ACD system for managing the operation of a switching system, for example a PABX, sometimes referred to as a PBX. There are three types of call centre: those which exclusively receive calls (order taking, customer service, and the like), those which only make calls (telesales, market research) and those which handle both incoming and outgoing calls. In the first and third types of call centre an ACD system is used to distribute or allocate calls incoming to a PABX to a plurality of terminals. These terminals, known in the art as call centre agent positions or ACD turrets, are positions at which people, referred to herein as agents, respond to the incoming telephone calls, and are frequently in the form of a known workstation incorporating a computer terminal linked to a host computer and database system. In call centres which make calls to customers an ACD system can be used to allocate to agents outgoing calls made to targetted customers (i.e. customers selected by the call centre to be the target of, for example, a telesales attempt).

Thus the distribution control systems used for each of the three types of call centre are all referred to in the art as ACD systems since they all respond to the handling by the PABX of an external call to connect the external port (line card) for that call to the internal port (line card) for a turret selected in accordance with the ACD program and to measure the activity at that selected turret to provide data input for data recordal and analysis by the measurement statistics package of the ACD system.

Examples of the use of an ACD suite are Given in the article "Call Centres Doing Business by Telephone" by Martin Bonner, The Journal of The Institution of British Telecommunication Engineers, Vol 13, Part 2, July 1994.

As is known, the ACD system may be programmed from its supervisor position by a supervisor to allocate incoming calls to the agents in a specified manner, for example, calls can be queued and distributed or allocated to the first agent to become ready to accept another call, or where several agents are ready, to the agent who has been ready the longest, or "forced" to an agent whose call handling rate is less than a predetermined limit. The measurement statistics package can determine, for example, the number of calls received, when they are received, how long it took to answer a particular call and how long it took an individual agent to deal with a call and how many calls were dealt with by an agent in a particular period.

ACD is generally performed by an "intelligent" PABX, that is a PABX incorporating an additional processor coupled to its call processing system to provide increased functionality, and in this case the ACD system can be considered to be an integral part of the PABX. In other cases the ACD system can be a physically separate item and linked to a "non-intelligent" PABX. Both arrangements are embraced by the term ACD suite.

A trend to increase the flexibility of working hours has meant that agents may not have their own individual terminal but may use any vacant terminal. Thus a terminal may be shared by two or more agents. This requires the ACD system to be aware of the identity of the person using a particular terminal in order that any measurement statistics can be ascribed to the correct person and this is achieved by the agent logging on to the ACD system via the terminal or via an associated computer terminal and host computer where there is an link to the PABX.

A further trend has been to increase the number of agents who will work either from their homes or at a convenient branch office and remote from the ACD suite or host computer. Such an agent is referred to herein as a teleworking agent.

WO-A-89 03146 (Ambassador College) discloses a computer-controlled ACD suite for distributing incoming calls to selected ones of a plurality of teleworking agents. At the start of a shift, the system retrieves from storage a set of telephone numbers, corresponding to a group of teleworking agents, controls outgoing line circuits to make a respective call to each teleworking agent, who answers with a log on procedure for identification. A teleworking agent who wishes to work that shift sends an accept message to the system which then marks that agent as ready for an incoming call. When an incoming call is received at an incoming line circuit, the system controls the line circuit to answer the incoming call, selects one of the ready teleworking agents, connects the incoming line circuit to the corresponding outgoing line circuit, and records the time. The system also records the end of the call (either when the caller hangs up, or upon receipt of an appropriate message from the teleworking agent). In one version of the system the teleworking agent stays on the line between calls and is sent a prompt tone just before the system commands the connection of the next incoming call to that teleworking agent. In another version, the teleworking agent is disconnected between calls and the system re-establishes the teleworking agent as an operational member of the shift as part of the sequence of operations for responding to an incoming call.

An ACD suite such as Ambassador College's suite is designed particularly for situations where the whole of the agent work force is teleworking and works in different shifts in different time zones, and in such a case there is no need for, and no provision for, a local group of agents disposed with the ACD suite, and forming part of the agent work force.

In contrast, the present invention is concerned with the problem of providing a teleworking facility in an ACD suite designed for a local work force of agents at a call centre.

One way of tackling this problem is disclosed in EP 0 622 938 A (AT & T Corp.), in which the ACD suite is coupled to a server which communicates with a teleworking agent via a data network. When a teleworking agent wishes to work, he makes a data call to the server and logs on in a conventional manner If the call is from the agent's normal location the server commands the switch to mark the teleworking agent logged in on the standard telephone number, and reports log in accepted to the teleworking agent.

When in the course of normal operation of the switch a teleworking agent is selected to deal with an incoming call, the switch marks that agent as busy and sends an event message to a management information system (which includes a statistics package for measuring the work performance of the agents) to indicate that the teleworking agent is busy on a call. The switch now retrieves the associated telephone number and routes the incoming call to the teleworking agent. When the teleworking agent answers the call, an event message is sent from his work station via the data link to the server which informs the management information system and the switch. When the teleworking agent disconnects from the caller, the work station sends a call ended event message to the server which informs the switch and the management information system of the ACD suite of this event. The teleworking agent will send various messages via the server to a host computer of the ACD suite to perform appropriate after call work relating to the nature of the call (e.g. recording the outcome of an accounts enquiry), and when this is complete, the teleworking agent will send a request to be made available signal to the server which informs the management information system that the teleworking agent is now available. The management information system informs the switch that the teleworking agent is available, and the switch now marks the agent as available for another call.

The above AT & T ACD suite is a typical example of an ACD suite which reroutes an incoming call to a remote location via an outgoing exchange line using a call diversion or similar facility, the result of which is that the ACD suite does not know when the teleworking agent answers the call (the ACD suite obtains this information from an event message from the work station) and likewise does not know when the teleworking agent ends the call (again, the ACD suite obtains this information from an event message from the work station).

It is known from EP-A-0 520 483 (Siemens Aktiengesellschaft) for an authorised person to use the facilities of a private branch exchange (PBX) from a network telephone external to the PBX, in particular recording the charges incurred for use of the public telecommunications network for calls involving the authorised person. In one embodiment, the authorised person makes a first call to the PBX by dialling the number of an assigned PBX extension. The PBX receives the call on an incoming line and in the normal manner connects the exchange line interface circuit (LIC) to the corresponding extension LIC for that assigned number, which is not provided with an extension telephone. If that LIC is in service and not marked busy, the PBX sends a free-line signal (ringing tone) to the authorised person who then goes on-hook to end that call. In the PBX a control unit responds to the calling of the assigned extension to access a table, retrieve a callback telephone number associated with the assigned extension number, and, for an integrated services digital network, deem the caller as authorised if the received calling line identity is found to be the same as the callback number (the callback number being the telephone number of the authorised person). The control unit now makes an external call (referred to as the second call) in known manner, sending the callback number to the local exchange of the public telecommunications network, and upon answering by the authorised person begins to record charging information (metering pulses) provided by the local exchange or to calculate the call charge by reference to duration and applicable tariff.

When the authorised person answers the second call, he dials the telephone number of a person with whom he wants to be connected (the desired person). This number is received by a signalling interface unit of the PBX, and in response the control unit makes another external call (referred to as the third call) in known manner, as before to the desired person. When the desired person answers the third call, the control unit connects the two external LICs via the PBX switch and begins to record charging information, or calculating the call charge, for the third call. The charging information associated with the second and the third calls is recorded in a memory assigned to the authorised person.

The PBX of the Siemens disclosure is similar to the rerouting (call diversion) arrangement of the AT & T arrangement, except that the diversion number is not already known to the PBX but is provided by the authorised person in the second call, and that both calls are originated by the PBX rather than just the diverted call.

SUMMARY OF THE INVENTION

According to a first aspect of the present invention, there is provided a method of teleworking in association with a call centre having an automatic call distribution (ACD) suite comprising a switching system and an ACD system, these systems being specifically designed for use with a work force of only local agents, and the method comprising the prior step of assigning a predetermined set of terminals of the switching system for teleworking use, and comprising the steps of:

recording in association with the identity of a teleworking agent who is to be made operational the network terminal number of a remote terminal at which the teleworking agent is to work;

selecting an available one of said predetermined set of terminals and associating its identity with the identity of said teleworking agent;

commanding the ACD system to include the identity of said teleworking agent and the associated terminal identity in its table of operational agents and the respective terminals at which they are working;

detecting when the ACD system allocates said selected terminal for the switching system to make a connection between said selected terminal and an external line circuit which is involved in an external call, either incoming, or, as the case may be, outgoing;

and, in response to said detecting;

retrieving said network terminal number;

commanding the switching system to make a separate external call to said network terminal number;

commanding the switching system to mark said selected terminal as being in an off-hook state; and commanding the switching system to join said separate external call to said external call.

An advantage of the present invention is that no modifications need to be made to existing PBXs of ACD suites in order to manage a teleworking agent. The ACD system does not know that the agent is teleworking but acts as if the teleworking agent were actually present at a local ACD turret and therefore processes the call activity of the ACD turret in the normal way. This data is recorded by a data recording and statistics analysis system of a management information function of the known ACD system and used to determine which agent is to be connected to the next external call and to provide agent performance information for the supervisor of the agents. The steps of the present invention may be performed by a computer-controlled apparatus, preferably a host computer, linked to the PBX and the ACD system and programmed to perform the steps of the invention. Such apparatus is preferably a Computer/Telephony Integration (CTI) controller under whose control the PABX answered the received call and made the separate external call. A CTI controller is preferably a computer linked to the call processing system of the PABX and arranged for direct control and monitoring of its call processing functions. The combination of a computer and a PABX in such a manner is known in the art as Computer/Telephony Integration (CTI). Modern PABXs may be provided with a CTI port to enable an external computer to be connected to the PABX as a CTI controller for detection of the various states of the PABX call processor and for directly controlling the PABX call processor.

Preferably, said step of selecting an available one of a predetermined set of terminals is constituted by selecting an available one of a set of dummy terminals connected to the switching system but not forming part of actual agent positions at the call centre.

Preferably, the switching system is commanded to join said calls in conference mode.

Preferably, the joining step is performed upon detecting answering of said separate external call. This is particularly advantageous when teleworking with enquiring customers (i.e. received calls) since the teleworking agent is in immediate communication with the customer and this not only provides a definite time for the teleworking agent to start talking but also permits accurate measurement of the teleworking agent's performance by measurement of the start and finish times of the separate call to the teleworking agent.

The marking of said selected terminal as being in an off-hook state is preferably performed at substantially the same time as the making of said separate external call, and when marking is so performed in conjunction with joining being performed upon detection answering of said separate external call, there is preferably included the step of compensating a data recording system of the ACD system for the period from said marking of said selected terminal to the detection of the answering of said separate external call.

According to a second aspect of the present invention there is provided a call control apparatus for use in a call centre having an automatic call distribution (ACD) suite comprising an ACD system and a switching system arranged to make and receive external calls and having an associated plurality of internal terminals, these systems being specifically designed for use with a work force of only local agents, the call control apparatus being arranged to receive the identity of a teleworking agent who is to be made operational and the identity of the network terminal number of a remote terminal at which the teleworking agent is to work, and to record these two associated identities;

to select an available one of a predetermined set of said terminals and to associate the identity of said selected terminal with the recorded identity of said teleworking agent;

to command the ACD system to include the identity of said teleworking agent and the associated terminal identity in its table of operational agents and respective associated terminals;

to detect when the ACD system allocates said selected terminal for the switching system to make a connection between said selected terminal and an external line circuit which is involved in an external call, either incoming, or, as the case may be, outgoing; and, in response thereto, to retrieve said network terminal number;

to command the switching system to make a separate external call to said network terminal number;

to command the switching system to mark said selected terminal as being in an off-hook state; and to command the switching system to join said separate external call to said external call.

The apparatus may be arranged to command the switching system to join said external calls in conference mode.

Call control apparatus in accordance with this second aspect of the present invention enables an ACD suite which is limited to providing statistics reports for a set of local agents, i.e. capable of recording call activity of only the internal line circuits of the switching system, to include teleworking agents within the management procedures for local agents. Thus, the ACD suite can have teleworking capability without the need to upgrade the switching system to provide for recording the equivalent call activities of the external line circuits. The cost of adding a control apparatus of the present invention to such an existing ACD suite would be considerably less than the cost of such an upgrade.

Preferably, the apparatus is arranged to command the switching system to join said external calls upon detecting answering of said separate external call.

Preferably, the apparatus is arranged to command the switching system to mark said selected terminal as being in an off-hook state at substantially the same time as it commands the switching system to make said separate external call. When the apparatus is so arranged to command the switching system to mark said selected terminal and is also arranged to command the switching system to join said external calls upon detecting answering of said separate external call, then preferably, the apparatus is also arranged to measure the period from said marking of said selected terminal to the detection of the answering of said separate external call and to command the ACD system to compensate its data recording system by the measured period.

Thus, where a PABX is able to make the separate external call and connect or join it to the incoming external call without the incoming external call having to be answered before the separate external call is made, the PABX will preferably not answer the incoming external call until the teleworking agent answers the separate outgoing external call. In this case, the customer making the incoming call experiences no delay from the time that the ringing tone ceases until the time when the teleworking agent answers the remote terminal. This is in contrast to the situation where the PABX first answers the incoming call before making the separate external call to the teleworking agent, since in this case, the ringing tone would cease at the time when the PABX answers the incoming call.

According to a third aspect of the present invention there is provided an ACD suite incorporating a call control apparatus of the abovementioned second aspect.

The predetermined set of terminals of the switching system of the ACD suite is preferably constituted by a set of dummy terminals connected to the switching system but not forming part of actual agent positions at the call centre. In this way no actual agent position is used for teleworking.

Since these terminals are connected to the PABX in the normal manner and are "known" to the PABX by their directory or equipment numbers, the ACD system will treat them no differently from terminals at actual agent positions. Thus a company can plan to have a certain number of teleworking agents and provide the corresponding number of dummy terminals, which do not need any desks or computer terminals nor functional telephones (since it is not intended that an allocated call be answered at such a terminal), although in practice it may be preferred to use a cheap telephone rather than a special-purpose terminating device which simulates a telephone, and achieve a cost saving compared with using an actual agent position for teleworking.

The identities, for example, the extension numbers (directory numbers), of these dummy terminals are recorded by the call control apparatus, which allocates an available dummy terminal to a teleworking agent wanting to become operational (whether upon request or upon acceptance ot an offer), and passes this information to the ACID system. The call control apparatus monitors the PABX activity and detects when the ACD system has commanded call activity involving one of the dummy terminals currently recorded as allocated to a teleworking agent, and commands the PABX in accordance with the above steps of the invention.

BRIEF DESCRIPTION OF THE DRAWINGS

Specific embodiments of the invention will now be described by way of example with respect to the accompanying drawings in which.

DETAILED DESCRIPTION OF THE EXEMPLARY EMBODIMENTS

Figure 1:
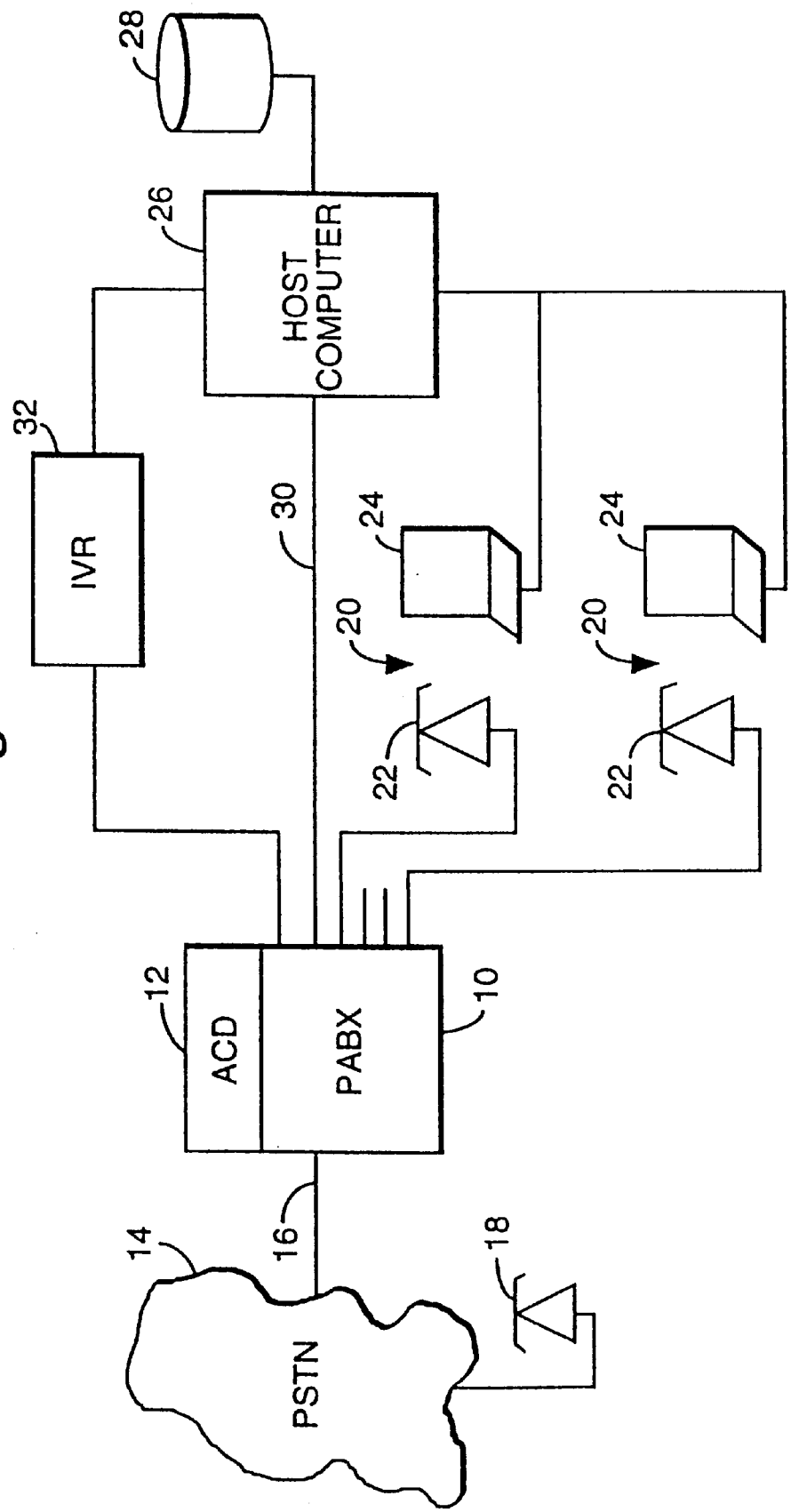
FIG. 1 shows a known ACD suite.

In FIG. 1 there is shown a known ACD suite used in a call centre such as British Telecommunications' national telephone account management operation, which is an example of the third type of call centre arranged to handle both incoming calls (order taking, customer service and the like) and outgoing calls (telesales, market research).

In FIG. 1, a PABX 10, constituting a switching system of the present invention, is associated with an ACD system 12 and connected to an Integrated Services Digital Network (ISDN) 14 by a primary rate ISDN link 16 having thirty 64 kbit/s channels. Customers, represented by telephone terminal 18, can make calls to the call centre by dialling the published directory number of the call centre. These incoming calls are received at the PABX 10 and placed in a queue by the ACD system 12. The ACD system 12 in known manner allocates the call at the head of that queue to a selected one of a plurality of call centre agent positions 20 (also referred to as a workstations), each comprising a telephone terminal 22 (also referred to as an ACD turret) and an associated computer terminal 24. The selected terminal 22 is normally that at the head of a queue of free agents. This queue contains the identities of the agents, but alternatively can contain the directory numbers associated with the agents.

Each computer terminal 24 is connected to a host computer 26 having an associated database 28 and connected to the PABX 10 via a CTI link 30. An interactive voice response system (IVR) 32 is connected to a port of the PABX 10 and to the host computer 26, and arranged to obtain data from customers and to pass this to the host computer 26 for processing as appropriate. In FIG. 1 only two workstations 20 are shown although in a call centre of a large company there may be in the region of a hundred workstations 20.

When an agent starts a work period at a workstation 20, he or she logs on to the ACD system 12 using the touchtone (Registered Trade Mark) keypad (not shown) of the terminal 22. Alternatively, the log on procedure can be performed via the computer terminal 24, the host computer 26 and the CTI link 30. The ACD system 12 records the identity of the agent in association with the identity (i.e. the directory number or the corresponding equipment number) of the terminal 22 of the workstation which that agent has now manned and makes various measurements of the activity of that terminal for the use of a statistics package of the ACD system 12, which is programmed for measuring the work performance of the various agents by measuring the activity of terminals 22, in known manner. The ACD system 12 is arranged to record for example the length of time taken to answer a call, the duration of any particular call, and the time between ending one call and answering the next one.

Figure 2:
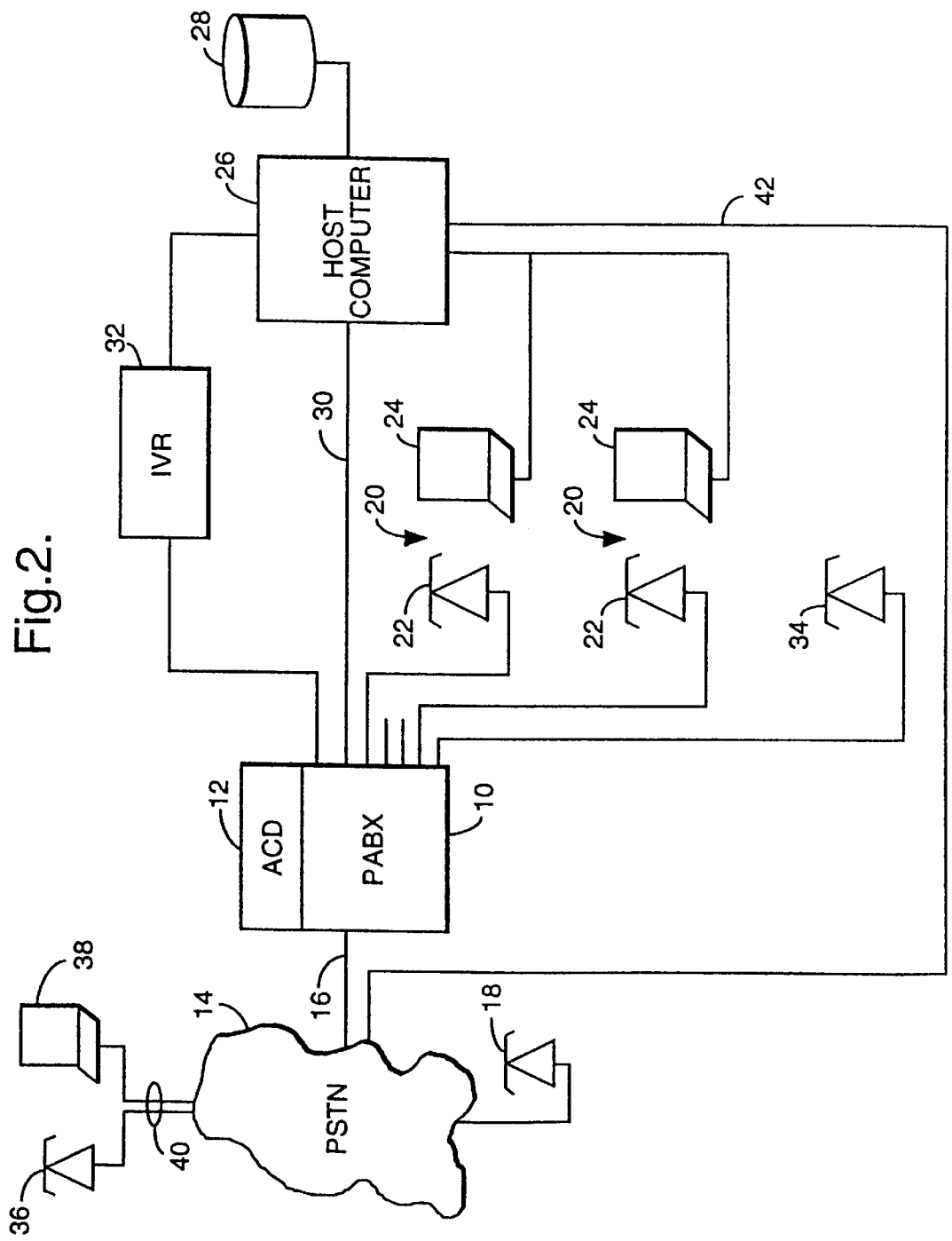
FIG. 2 shows an embodiment of the present invention.

In FIG. 2, the host computer 26, constituting a call control apparatus of the present invention, is programmed to monitor activity of the call control processor (not shown) of the PABX 10 and to send command messages to the call control processor as will be described below.

The host computer 26 contains a list of the identities of, say, ten terminals 34 which are designated as dummy turrets for teleworking only and are not disposed on a desk for use by an agent. These terminals 34 constitute a predetermined set of terminals of the present invention. Since these terminals 34 are not intended to be manned by an actual agent, they do not need to be functional terminals nor do they need to have associated computer terminals 24 since they are dummy turrets and are not part of operational workstations 20. Although terminals 34 can be the same as terminals 22, if desired they could be simple devices which appear to the PABX 10 as on hook telephones. Alternatively, the PABX 10 could be configured so that it has a set of dummy ports for association with teleworking agents. In other words, the call control processor will command connection of the ringing current generator to a selected dummy port under the control of the ACD 12, and cease the connection under the control of the host computer 26, but the PABX 10 will not be aware that these dummy ports do not exist.

The system shown in FIG. 2 is arranged to handle a plurality of teleworking agents at respective remote workstations, i.e. other than ACD workstations at the call centre. As mentioned, the location of a remote workstation (or terminal if there is no computer terminal) could be one of a variety of places. For the purpose of this example it will be assumed that the remote workstations are located in the private residences of teleworking agents. The workstations (only one of which is shown) comprise respective telephone terminals 36 and computer terminals 38 which are connected to the ISDN 14 via respective basic rate ISDN links 40. The ISDN links 40 provide two independent 64 kbit/s (B) channels and a 16 kbit/s data channel. Thus calls can be made and charged independently from each of the terminals 36 and 38. The host computer 26 is connected to the ISDN 14 via a primary rate ISDN link 42. In variants the link 42 is a basic rate ISDN link.

In order to support teleworking, the ACD system 12 must still associate a teleworking agent's identity with the identity of what it deems to be an active terminal 22 in the call centre, and the manner in which this is achieved will now be described.

In a first situation, a teleworking agent will activate his or her computer terminal 38 which will autodial the directory number of the host computer 26. When a connection (using one of the B channels) has been established via the ISDN 14, the teleworking agent will log on to the host computer 26 using an identification protocol including informing the host computer 26 of the directory number being currently used by the teleworking agent, and the host computer 26 will store the teleworking agent's directory number in association with the identity of teleworking agent. This receiving of the identity of the teleworking agent and the identity of the remote terminal by the host computer 26 constitutes acquisition of these identities by the host computer 26. In a variant where a teleworking agent is not permitted to change location without prior consent of the company, the teleworking agent does not inform the host computer 26 of the identity of the remote terminal, and the host computer 26 will refer to its record and retrieve the appropriate data. In this case the retrieval by the host computer 26 of the identity of the remote terminal constitutes acquisition of this identity by the host computer 26.

The host computer 26 will now select an available terminal 34 from its list of dummy turrets, associate the teleworking agent's identity with the identity of the selected terminal 34, and send them to the ACD system 12 via the CTI link 30. The host computer 26 now has a record associating the identity of the agent, the identity of the remote terminal, and the identity of the selected terminal 34 and can upon interrogation by the identity of a terminal 34 retrieve the identity of the corresponding remote terminal.

In a different situation where the teleworking agent has no computer terminal 38, he or she will dial the directory number of an interactive voice response (IVR) system 32 which will perform the log on protocol using a dual tone multifrequency reception technique, pass the authenticated identity to the host computer 26, and instruct the teleworking agent to terminate that call.

There are a number of ways in which the system can be configured to operate, some of these will be described below.

Since the ACD system 12 now holds a record for the selected terminal 34 which indicates that it is manned by an agent (i.e. the record contains the teleworking agent's identity), handling of incoming calls proceeds in the normal manner with the selected terminal 34 being treated no differently from any of the terminals 22. However, when the ACD system 12 allocates the selected terminal 34 to receive an incoming call, so that PABX 10, under the control of the ACD system 12, now connects the call to the respective line card (not shown) and applies ringing current to the selected terminal 34 and ringing tone to the incoming call, the host computer 26 detects that PABX 10 has connected a call to a terminal which is recorded as being a teleworking terminal. In other words, the host computer 26 recognises that this terminal is one of the stored set of dummy turrets and is currently marked or flagged as being "manned".

In a variant, the host computer 26 monitors the action of the ACD system 12 in allocating a terminal and commanding the PABX 10 to extend the incoming call to the allocated terminal, and recognises when an allocated terminal is one which is known to the host computer 26 as a current teleworking terminal.

The host computer 26 responds to this recognition by commanding PABX 10 to treat the selected terminal 34 as having gone off-hook, i.e. as being answered, and thereby cease applying ringing current to it (in practice the time taken for host computer 26 to react is so short that the selected terminal 34 would make no audible sound, if it were capable of so doing), and to make an outgoing call to the directory number associated with the selected terminal 34 in the record stored in host computer 26, this being the teleworking agent's telephone.

When the host computer 26 detects that the PABX 10 has registered that the remote teleworking agent has answered this outgoing call, the host computer 26 then instructs the PABX 10 to join the incoming call to the outgoing call, by for example a conference bridge.

In this way the PABX 10 treats the incoming call as if it had been actually answered at the selected terminal 34 and is thus able to monitor the call and provide the required measurement information to the ACD system 12. The timing of that call allocated to that teleworking agent starts only from the moment that the PABX 10 answers the incoming call by disconnecting the call from a ringing tone generator (not shown). The ACD system 12 records the actual start and stop times available from the PABX 10.

In an alternative method of operation, when an incoming call is received by the PABX 10 and allocated by the ACD system 12 to the selected terminal 34, the host computer 26 upon detecting that an incoming call has been connected to "teleworking" terminal 34 instructs the PABX 10 to answer the call (i.e. cease ringing tone), to connect the incoming call via a conference bridge to the IVR 32, and to make an outgoing conference call to the remote teleworking agent at the recorded teleworking agent's directory number (i.e. the location of terminal 36). The host computer 26 also instructs IVR 32 to play an announcement or music to the customer, and instructs PABX 10 to join the incoming call and the outgoing call using the conference bridge upon answering of the outgoing call by the teleworking agent, dropping the IVR 32 from the conference connection.

The host computer 26, through the CTI link 30, knows the time at which the PABX 10 made the outgoing conference call to the teleworking agent and the time when that call was answered and will send a compensating signal to the ACD system 12. In this case, the ACD system 12 will modify the recorded measurement of the call duration at the selected terminal 34 by deducting the time value of the compensating signal.

In cases where there is no computer terminal 38 associated with the remote teleworking terminal 36, special signals could be sent, via the IVR 32, using a touchtone keypad having star and hash keys to provide indicators of status, such as ready, not ready etc.

A further variant on this could be used in a type two or type three call centre of a telesales company which employs people to make outgoing sales calls, and some of these people are teleworking agents located remotely from the company offices and working from their own private residences. In one example, a teleworking agent would start a work period by logging on to the host computer 26 using the teleworking agent's computer terminal 38 via the ISDN links 40 and 42. The host computer 26 will select an available one of the terminals 34, send appropriate messages to the ACD system 12, as described above, and then download to the teleworking agent's computer terminal 38 relevant customer information. The teleworking agent will then select from the screen display a particular customer to be the subject of a telesales attempt. The host computer 26 will then instruct the PABX 10 to make a first call to the teleworking agent via the ISDN link 40. When the teleworking agent answers the call, the host computer 26 will instruct the PABX 10 to make a second call to the selected customer, and will generate a speech message to inform the teleworking agent that an outgoing call to the selected customer is being established. The teleworking agent would then be put on hold. When the selected customer answers, the host computer 26 would instruct the PABX 10 to connect the calls in conference mode. The ACD system 12 will thus monitor the call in the normal way and thereby produce its statistics.

In another example of telesales using teleworking agents, a teleworking agent will log on to the host computer 26 to start a work period, and the host computer 26 will select an available dummy terminal 34, i.e. one that is not "manned", command the ACD system 12 to record the teleworking agent's identity in association with the identity of the selected terminal 34, as before. As far as the ACD system 12 is concerned the teleworking agent is now a member of the set of agents recorded as currently working i.e. active, and from which it will select an available agent. The host computer 26 will now, under the control of a telesales program, select a target customer and send a command message to the ACD system 12 to select an available agent in accordance with its allocation program and to make a call to the corresponding turret. In the event that the turret allocated by the ACD system 12 is recognised by the host computer 26 as a dummy turret (one of the set of terminals 341 currently allocated or associated with a teleworking agent, the host computer 26 will instruct the PABX 10 to treat the call to the selected turret as answered, and to make a separate outgoing call to the teleworking agent. When the host computer 26 detects that the teleworking agent has answered, it will then send command messages to the PABX 10 to make a call to the target customer, and connect or join all three calls in conference mode. Alternatively, the call to the dummy terminal can be joined to the call to the teleworking agent when this latter call is answered. As soon as the host computer 26 knows to which agent the ACD system 12 has allocated the call, it will at the same time as commanding the outgoing call to the teleworking agent download the target customer's details to the teleworking agent's computer terminal 38.

Because of the ability of the CTI relationship of the PABX 10 and the host computer 38, the host computer 38 will be aware of when a telesales customer rings off and can anticipate that the respective agent will soon become ready to deal with another customer and will have already selected the details of the next target customer. Where the call centre supports many teleworking agents, the ACD system 12 will proceed to select target customers and make outgoing calls to them as long as there is an entry in the queue of free agents.

In a variant, the host computer can proceed with setting up the call to the next target customer after a current customer has rung off, even though the free agent queue is empty, provided that at least one agent meets the requirements for having a new call forced upon the agent, for example, the agent is recorded as operational (i.e. logged on for a work period), and has had a "not ready" status for more than a predetermined time limit. Where the agent has a computer terminal 10 38, communication of status to the ACD 12 will be via the host computer 26.

In such a telesales environment as described above, instead of a teleworking agent initiating a work period, the host computer 26 could be programmed to offer a work period to a selected non-operational teleworking agent. The host computer 26 would select the identity of a non-operational teleworking agent, i.e. one that was not currently logged on to the host computer 26, select a dummy terminal 34 and associate its identity with that of the teleworking agent, to make an outgoing call from the selected terminal 34 to the relevant directory number, and, upon acceptance by the teleworking agent of the invitation to work, to instruct the PABX 10 to record the teleworking agent's identity in association with the selected terminal 34 in the ACD 12. Thus the teleworking agent becomes a member of the set of working agents "seen" by the ACD system 12. It will be understood that this arrangement has the common feature that the ACD system 12 records the association of a teleworking agent identity with a particular terminal 34, and that the host computer 26 controls the making and joining of the call to the teleworking agent whereby all work calls to customers originate at the call centre.

Whereas in the abovedescribed embodiments the PABX 10 is dedicated to an ACD function and all its terminals 24 are ACD turrets, in a variant the PABX 10 could have additional terminals which were not ACD terminals.

The ACD system 12 could be an integral part of the call control process of the PABX 10 or could be a separate entity and coupled to the PABX 10 via a suitable link.

As described, the remote teleworking agent is located at a private telephone in a domestic residence. Alternatively, the teleworking agent could be located at a non-ACD terminal connected to the PABX 10 but in a different room or site, or connected to a different PABX interworking with PABX 10.

What is claimed is:

1. A method of teleworking in association with a call center having an automatic call distribution (ACD) suite comprising a switching system and an ACD system, these systems being specifically designed for use with a work force of only local agents, and the method comprising the prior step of assigning a predetermined set of local terminals of the switching system for teleworking use, and comprising the steps of:

recording in association with the identity of a teleworking agent who is to be made operational the network terminal number of a remote terminal at which the teleworking agent is to work;

selecting an available one of said predetermined set of local terminals and associating its identity with the identity of said teleworking agent;

commanding the ACD system to include the identity of said teleworking agent and the associated terminal identity in a table of operational agents and the respective terminals at which they are working;

detecting when the ACD system allocates said selected terminal for the switching system to make a connection between said selected terminal and an external line circuit which is involved in an external first call;

and, in response to said detecting:

retrieving said network terminal number;

commanding the switching system to make an external second call to said network terminal number;

commanding the switching system to mark said selected terminal as being in an off-hook state; and commanding the switching system to join said external second call to said external first call.

2. A method as claimed in claim 1, wherein said step of selecting an available one of said predetermined set of terminals is constituted by selecting an available one of a set of dummy terminals connected to the switching system but not forming part of actual agent positions at the call center.

3. A method as claimed in claim 1, wherein the switching system joins said external first and second calls in conference mode.

4. A method as claimed in claim 1, wherein the switching system joins said external first and second calls upon detecting answering of said external second call.

5. A method as claimed in claim 4 wherein the marking of said selected terminal as being in an off-hook state is performed at substantially the same time as the making of said external second call, and including the step of compensating a data recording system of the ACD system for the period from said marking of said selected terminal to the detection of the answering of said external second call.

6. A method as claimed in claim 1, wherein the marking of said selected terminal as being in an off-hook state is performed at substantially the same time as the making of said external second call.

7. A call control apparatus for use in a call center having an automatic call distribution (ACD) suite comprising an ACD system and a switching system arranged to make and receive external calls and having an associated plurality of local terminals, these systems being specifically designed for use with a work force of only local agents, the call control apparatus being arranged:

to receive the identity of a teleworking agent who is to be made operational and the identity of the network terminal number of a remote terminal at which the teleworking agent is to work, and to record these two associated identities;

to select an available one of a predetermined set of said local terminals and to associate the identity of said selected terminal with the recorded identity of said teleworking agent;

to command the ACD system to include the identity of said teleworking agent and the associated terminal identity in a table of operational agents and respective associated terminals;

to detect when the ACD system allocates said selected terminal for the switching system to make a connection between said selected terminal and an external line circuit which is involved in an external first call; and in response thereto:

to retrieve said network terminal number;

to command the switching system to make an external second call to said network terminal number;

to command the switching system to mark said selected terminal as being in an off-hook state; and to command the switching system to join said external second call to said external first call.

8. Apparatus as claimed in claim 7, and arranged to command the switching system to join said external first and second calls in conference mode.

9. Apparatus as claimed in claim 7, and arranged to command the switching system to join said external first and second calls upon detecting answering of said external second call.

10. Apparatus as claimed in claim 9, and arranged to:

command the switching system to mark said selected terminal as being in an off-hook state at substantially the same time as it commands the switching system to make said external second call and measure the period from said marking of said selected terminal to the detection of the answering of said external second call and to command the ACD system to compensate its data recording system by the measured period.

11. Apparatus as claimed in claim 7, and arranged to command the switching system to mark said selected terminal as being in an off-hook state at substantially the same time as it commands the switching system to make said external second call.

12. An ACD suite incorporating a call control apparatus as claimed in claim 7.

13. An ACD suite as claimed in claim 12, wherein the switching system comprises a set of dummy terminals connected to the switching system and constituting said predetermined set.

14. A method of teleworking from remote terminals using a system designed for use with only local terminals, comprising:

associating a network terminal number of one of the remote terminals with the identity of a teleworker using that remote terminal and associating one of the local terminals with the identity of the teleworker; and detecting when the local terminal associated with the identity of the teleworker is allocated for connection to a call involving a first external line circuit, and, in response to the detecting:

using the network terminal number for the remote terminal used by the teleworker to make a call to that remote terminal; and joining the call involving the first external line circuit to the call to the remote terminal used by the teleworker.

15. A method as claimed in claim 14, wherein the call involving the first external line circuit and the call to the remote terminal used by the teleworker are joined in conference mode.

16. A method as claimed in claim 14, wherein the detecting of when the local terminal associated with the identity of the teleworker is allocated for connection to a call involving a first external line circuit is in response to a selection by the teleworker of a customer for a telesales attempt.

17. A method as claimed in claim 14, wherein the detecting of when the local terminal associated with the identity of the teleworker is allocated for connection to a call involving a first external line circuit is in response to an incoming customer call to the system.

18. A call control apparatus for providing teleworking capability from remote terminals usable with a system designed for use with only local terminals, the call control apparatus being configured to:

associate a network terminal number of one of the remote terminals with the identity of a teleworker using that remote terminal and associating one of the local terminals with the identity of the teleworker; and detect when the local terminal associated with the identity of the teleworker is allocated for connection to a call involving a first external line circuit, and, in response thereto:

to use the network terminal number for the remote terminal used by the teleworker to make a call to that remote terminal; and to join the call involving the first external line circuit to the call to the remote terminal used by the teleworker.

19. A call control apparatus as claimed in claim 18, wherein the call involving the first external line circuit and the call to the remote terminal used by the teleworker are joined in conference mode.

20. A call control apparatus as claimed in claim 18, wherein the call control apparatus detects when the local terminal associated with the identity of the teleworker is allocated for connection to a call involving a first external line circuit in response to a selection by the teleworker of a customer for a telesales attempt.

21. A call control apparatus as claimed in claim 18, wherein the call control apparatus detects when the local terminal associated with the identity of the teleworker is allocated for connection to a call involving a first external line circuit in response to an incoming customer call to the system.

* * * * *